May 16, 1939.  W. SCHADE  2,158,202
LENS SYSTEM
Filed Nov. 19, 1937
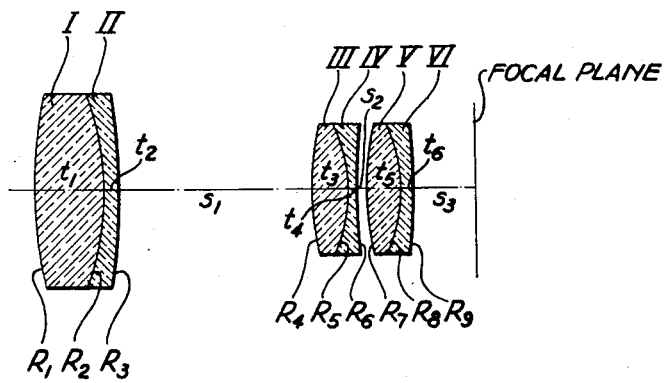
f/1.3    F = 100 mm.
| LENS | GLASS | RADII | SPACINGS |
|---|---|---|---|
| I | $N_0 = 1.5224$ $\nu = 59.6$ | $R_1 = +93.2$ mm. | $t_1 = 28.5$ mm. |
| II | $N_0 = 1.6164$ $\nu = 36.6$ | $R_2 = -75.1$ mm. $R_3 = -2097.0$ mm. | $t_2 = 4.75$ mm. $s_1 = 76.3$ mm. |
| III | $N_0 = 1.5163$ $\nu = 64.0$ | $R_4 = +67.3$ mm. $R_5 = -60.5$ mm. | $t_3 = 14.6$ mm. $t_4 = 3.64$ mm. |
| IV | $N_0 = 1.5750$ $\nu = 42.7$ | $R_6 = +411.0$ mm. | $s_2 = 3.25$ mm. |
| V | $N_0 = 1.5163$ $\nu = 64.0$ | $R_7 = +85.0$ mm. $R_8 = -48.9$ mm. | $t_5 = 14.6$ mm. $t_6 = 3.64$ mm. |
| VI | $N_0 = 1.5750$ $\nu = 42.7$ | $R_9 = -800.0$ mm. | $s_3 = 27.65$ mm. (Back Focus) |
Willy Schade
INVENTOR
BY
ATTORNEYS Patented May 16, 1939

2,158,202

UNITED STATES PATENT OFFICE 2,158,202

LENS SYSTEM

Willy Schade, Rochester, N. Y., assignor to Eastman Kodak Company, Rochester, N. Y., a corporation of New Jersey Application November 19, 1937, Serial No. 175,473

6 Claims. (Cl. 88—57)

This invention relates to lens systems and particularly to image forming lens systems such as are used in photography.

More specifically it relates to image forming systems of high magnification, i. e. systems which are particularly useful when employed to have conjugate images vastly different in size. In photography or cinematography the image on the film is usually many times smaller than the original subject. In lantern slide or cinematographic projection, the image on the screen is many times larger than that on the slide or film.

It is an object of the invention to provide an objective particularly suitable for projection purposes or when reversed, for photographic purposes. For convenience, I include all such lenses under the self-explanatory term "high magnification image forming systems".

As a high magnification image forming lens, it is common practice to use a Petzval type lens consisting of two widely spaced achromats, the one on the long focus side usually being a cemented doublet and the one on the short focus side being either a cemented or a spaced doublet.

It is an object of the present invention to provide a modified Petzval lens system more highly corrected than hitherto. The system provided thereby is highly corrected over a wide field and is capable of working satisfactorily at an aperture of about f. 1.3 whereas previously proposed modifications have reached only f. 1.5 or f. 1.6.

With certain minor exceptions, a Petzval type lens system is one having two widely spaced achromatic components. The invention is not particularly concerned with the one on the long focus side which may be a simple doublet or if desired may be modified to follow any suitable prior teachings with regard to this component. According to the invention, the other component, however, is specifically arranged to have its stronger curvatures convex toward the short focus side of the objective and preferably consists of a plurality of cemented doublets (two being sufficient for most purposes) in each of which the cemented surface is the strongest one and is convex to the short focus side, i. e. concave to the other component. The components on the long and the short focus sides are usually called the front and rear components respectively, but the light enters the system from opposite sides depending on whether it is used for taking or projection purposes.

In connection with the various front components which may be used herewith, I describe and claim one particular arrangement in a copending application Serial No. 175,474, filed concurrently herewith.

Other objects and advantages of the present invention will be apparent from the following description when read in connection with the accompanying drawing showing a preferred embodiment thereof.

The lens system shown in cross section in the accompanying drawing has the following specifications which correspond to the table accompanying the drawing. f/1.3 F=100 mm.

| Lens | Glass | Radii | Spacings |
|------|-------|-------|----------|
| I | $N_D=1.5224$<br>$\nu=59.6$ | $Mm.$<br>$R_1=+93.2$<br>$R_2=-75.1$ | $Mm.$<br>$t_1=28.5$<br>$t_2=4.75$ |
| II | $N_D=1.6164$<br>$\nu=36.6$ | $R_3=-209.2$ | $S_1=76.3$ |
| III | $N_D=1.5163$<br>$\nu=64.0$ | $R_4=+67.3$<br>$R_5=-60.5$ | $t_3=14.6$<br>$t_4=3.64$ |
| IV | $N_D=1.5750$<br>$\nu=42.7$ | $R_6=+411.0$ | $S_2=3.25$ |
| V | $N_D=1.5163$<br>$\nu=64.0$ | $R_7=+85.0$ | $t_5=14.6$<br>$t_6=3.64$ |
| VI | $N_D=1.5750$<br>$\nu=42.7$ | $R_8=-48.9$<br>$R_9=-800.0$ | $S_3=27.65$ (back focus) |

Following Petzval's teachings this lens is made up of two widely spaced achromatic components. The space ($S_1$) is shown as about 75 per cent of the focal length of the system. In the above mentioned copending application, the modified Petzval lens shown has a spacing between the components which is only slightly greater than one quarter of the focal length of the system. Thus a Petzval type lens may be defined as one having two achromats spaced by more than one quarter of the focal length or in the more usual cases more than one half of the focal length. Petzval lenses have also been proposed in which the components are not separately fully achromatized—one component being over corrected to compensate for the other. Such variations may be incorporated with the present invention without departing from the spirit thereof. According to the invention, the rear component is made up of two cemented doublets, elements III, IV, V and VI, the cemented surfaces ($R_5$ and $R_8$) of which are convex to the short focus side of objective and in each case are stronger than the outer surfaces of the doublet.

The plurality of doublets making up the rear component may be identical for economy in manufacture, if desired, but in the preferred arrangement shown, they are not identical.

I have found that a lens made up according to my invention retains all of the good characteristics of the Petzval type lens, namely, good correction for spherical aberration and coma; in fact, it even improves these factors somewhat. In addition, there is a very considerable reduction of the curvature of field and astigmatism, partly due to the reduced Petzval sum. It will be understood that the invention is not limited to the specific structure shown, but is of the scope of the appended claims.

What I claim and desire to secure by Letters Patent of the United States is:

1. An image forming objective comprising an achromatic front component and an achromatic rear component spaced therefrom more than one quarter of and less than twice the focal length of the objective, said rear component consisting of two doublets each having a cemented surface concave to the front component and with a radius of curvature less than its outer surfaces and greater than one quarter of the focal length of the objective.

2. A high aperture, high magnification, image forming objective having as a component on the long focus side an achromat and a second achromatic component spaced therefrom about three-fourths of the focal length of the objective, said second component comprising two separate doublets the cemented surfaces of which are convex to the short focus side of the objective and the rear surfaces of which have radii of curvature greater than the respective cemented surfaces.

3. A lens for projecting lantern slides comprising an achromatic front component and an achromatic rear component spaced more than quarter the focal length of the lens from the front component and between said front component and the plane for the lantern slide, said rear component consisting of two separate doublets each having its cemented surface convex to said lantern slide plane.

4. A Petzval type of lens having an achromatic front component and an achromatic rear component consisting of a plurality of doublets in which the cemented surfaces are concave to the front component and have stronger curvatures than the outer surfaces.

5. A Petzval type lens having front and rear components separately corrected for color and together fully corrected for at least two colors to form an achromatic system, the rear component consisting of a plurality of doublets in which the cemented surfaces are concave to the front component and have stronger curvatures than the outer surfaces.

6. An objective of the Petzval type, in which the rear component consists of two doublets with their cemented surfaces concave to the front component.

WILLY SCHADE.